US012148353B2

(12) United States Patent
Kim et al.

(10) Patent No.: US 12,148,353 B2
(45) Date of Patent: Nov. 19, 2024

(54) DISPLAY CONTROLLER AND DISPLAY DEVICE INCLUDING THE SAME

(71) Applicant: Samsung Electronics Co., Ltd., Suwon-si (KR)

(72) Inventors: Seong Woon Kim, Suwon-si (KR); Kil Whan Lee, Seoul (KR); Sun-Ae Kim, Yongin-si (KR); Sang Hoon Lee, Seoul (KR); Yong Kwon Cho, Yongin-si (KR); Sang Hoon Ha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 17/867,033

(22) Filed: Jul. 18, 2022

(65) Prior Publication Data

US 2023/0169909 A1 Jun. 1, 2023

(30) Foreign Application Priority Data

Nov. 29, 2021 (KR) ........................ 10-2021-0166804

(51) Int. Cl.
*G09G 3/20* (2006.01)

(52) U.S. Cl.
CPC ....... *G09G 3/2096* (2013.01); *G09G 2360/12* (2013.01); *G09G 2360/18* (2013.01)

(58) Field of Classification Search
CPC ............. G09G 3/2096; G09G 2360/12; G09G 2360/18
See application file for complete search history.

(56) References Cited

U.S. PATENT DOCUMENTS

| | | | | |
|---|---|---|---|---|
| 8,381,223 | B2 | 2/2013 | Van Dyke et al. | |
| 10,284,415 | B1 | 5/2019 | Alabsi | |
| 10,734,025 | B2 | 8/2020 | Bradley et al. | |
| 10,812,407 | B2 | 10/2020 | Aronovich et al. | |
| 10,887,035 | B2 | 1/2021 | Islam et al. | |
| 11,019,620 | B2 | 5/2021 | Ji et al. | |
| 2016/0063668 | A1* | 3/2016 | Kim | G06T 1/60 345/536 |
| 2018/0197482 | A1* | 7/2018 | Choi | G09G 3/3266 |

FOREIGN PATENT DOCUMENTS

KR 20090024542 A 3/2009

* cited by examiner

*Primary Examiner* — Xin Sheng
(74) *Attorney, Agent, or Firm* — Harness, Dickey & Pierce, P.L.C.

(57) ABSTRACT

A display controller includes a resource controller configured to receive layer information about each of a first layer and a second layer that are output at different times through a display panel during a unit frame. The display controller includes a data input direct memory access (DMA) configured to receive first image data corresponding to the first layer and second image data corresponding to the second layer, and a hardware resource configured to receive the first and second image data from the data input DMA, process the received first and second image data according to the layer information, and generate first layer data of the first layer and second layer data of the second layer. The resource controller is configured to control the data input DMA according to the layer information to determine an order in which the first and second image data are provided to the hardware resource.

17 Claims, 15 Drawing Sheets

DISPLAY CONTROLLER AND DISPLAY DEVICE INCLUDING THE SAME

CROSS-REFERENCE TO RELATED APPLICATION

This application claims priority from Korean Patent Application No. 10-2021-0166804 filed on Nov. 29, 2021 in the Korean Intellectual Property Office, and all the benefits accruing therefrom under 35 U.S.C. 119, the contents of which in its entirety are herein incorporated by reference.

BACKGROUND

Various example embodiments relate to a display controller and a display device including the same.

In a display device, an image may be output through a display panel as a result of composition and blending of multiple layers.

On the other hand, in recent years, as the number of display devices increases, the number of layers to be supported has also increased, such as the desire for one mobile set to drive a plurality of display devices at the same time.

In the past, each layer could use a hardware resource to form one layer. For example, each layer could use a FBC (Frame Buffer Compressor), a scaler, and the like, which may cause a problem of increases in an area and power consumption of the display device.

In order to solve such a problem, active research that can reduce or minimize the area and power consumption of the display device is being conducted.

SUMMARY

Aspects of various example embodiments provide a display controller capable of reducing or minimizing power consumption and an area of the device through sharing of hardware resources using time-sharing.

Aspects of various example embodiments also provide a display device including a display controller capable of reducing or minimizing power consumption and the area of the device through sharing of hardware resources using time-sharing.

However, aspects of the various example embodiments are not restricted to those set forth herein. The above and other aspects of various example embodiments may be apparent by referencing the detailed description of the present disclosure given below.

According to an aspect of various example embodiments, a display controller includes a resource controller configured to receive layer information about each of a first layer and a second layer before output of the first and second layers, and the first and second layers are output at different times through a display panel during a unit frame. The display controller includes a data input direct memory access (DMA) configured to receive first image data and second image data from outside the display controller, with the first image data corresponding to the first layer and the second image data corresponding to the second layer. The display controller includes a hardware resource configured to receive the first and second image data from the data input DMA, process the received first and second image data according to the layer information, and generate first layer data of the first layer and second layer data of the second layer. The resource controller is configured to control the data input DMA according to the layer information to determine an order in which the first image data and the second image data are provided to the hardware resource.

According to another aspect of various example embodiments, a display device includes a processor configured to generate first image data and second image data, a memory configured to store the first and second image data, and a display controller configured to read and process the first and second image data from the memory. The display controller is configured to receive layer information about a first layer corresponding to the first image data and a second layer corresponding to the second image data, before the first and second image data are processed and output through the display panel. The display controller is configured to generate first layer data corresponding to the first layer and second layer data corresponding to the second layer at different times within a unit frame, according to the layer information, and the layer information includes at least one of position information about a position of each layer output during the unit frame, and resource information about a resource to be allocated to output each layer, with the resource included in the display controller.

According to another aspect of various example embodiments, a display device includes a display controller configured to process first image data and second image data input to the display controller, and generate frame data including first layer data corresponding to the first image data and second layer data corresponding to the second image data. The display device includes a display drive circuit configured to receive the frame data from the display controller and drive the display panel according to the frame data, and a display panel configured to output an image according to the frame data. The image includes first and second layers which are output at different times from each other during a unit frame. Before the first and second layers are output through the display panel, the display controller is configured to receive layer information about each of the first and second layers, and process the first image data and the second image data. The layer information includes at least one of position information about a position of each layer that is output during the unit frame, and resource information about a resource that needs to be allocated to output each layer, with the resource included in the display controller.

Other features and example embodiments may be apparent from the following detailed description, the drawings, and the claims.

BRIEF DESCRIPTION OF DRAWINGS

The above and other aspects and features of various example embodiments may be apparent by describing in detail some embodiments with reference to the attached drawings, in which.

DETAILED DESCRIPTION OF VARIOUS EXAMPLE EMBODIMENTS

Hereinafter, various example embodiments according to the inventive concepts will be described referring to the accompanying drawings.

Figure 1:
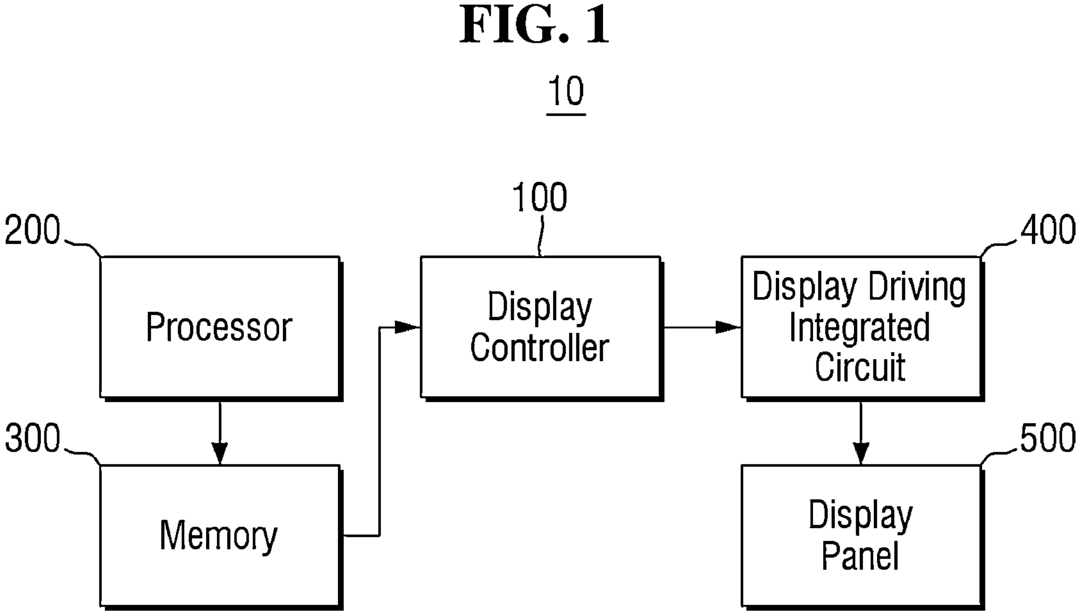
FIG. 1 is a block diagram for explaining the display device according to some example embodiments.

FIG. 1 is a block diagram for explaining the display device according to some example embodiments.

Referring to FIG. 1, the display device 10 may include a display controller 100, a processor 200, a memory 300, a display driving integrated circuit (DDI) 400, and a display panel 500.

For convenience of explanation, the processor 200 will be described first. The processor 200 may generate image data. For example, the processor 200 may include an image sensor and an ISP (Image Sensor Processor), may include an application processor (AP) mounted on a mobile device, and may include a GPU (Graphic Processing Unit) and a CPU (Central Processing Unit).

However, example embodiments are not limited thereto, and the processor 200 may include other configurations for acquiring the image data. The processor 200 may provide the generated image data to the memory 300.

The memory 300 may store the image data provided from the processor 200. For example, the memory 300 may include a volatile memory such as a SRAM or a DRAM. However, example embodiments are not limited thereto, and the memory 300 may include a non-volatile memory such as a flash memory, a PRAM, and an RRAM.

In some example embodiments, the memory 300 is also implementable inside the same package as the processor 200. Further, although not shown in FIG. 1, the memory 300 may further include a storage device for data storage such as an SSD (Solid state Drive).

The display controller 100 may read the image data stored in the memory 300 and perform data processing work before transmitting the image data to the display drive circuit 400. For example, the display controller 100 may read and process the image data stored in the memory 300, and transmit the frame data to the display drive circuit 400 so that the image is output from the display panel 500 for each unit frame. Examples of specific contents will be described later.

The display drive circuit 400 may receive the frame data generated by processing the image data from the display controller 100. The display drive circuit 400 may drive the display panel 500 on the basis of the frame data. Specifically, the display drive circuit 400 may drive the display panel 500 by transferring a signal through a plurality of gate lines and a plurality of data lines connected to the display panel 500.

The display panel 500 may receive a gate signal and a data signal according to the frame data from the display drive circuit 400. The display panel 500 may include a plurality of pixels connected to each of the plurality of gate lines and the plurality of data lines. The display panel 500 may display an image by penetration of the light generated by a backlight unit. In an example embodiment, the display panel 500 may be, but is not limited to, a liquid crystal display (LCD).

On the other hand, although the display controller 100 and the processor 200 are shown as separate configurations in FIG. 1, example embodiments are not limited thereto, and the display controller 100 and the processor 200 may also be implemented by being mounted on system-on-chip (SoC).

Figure 2:
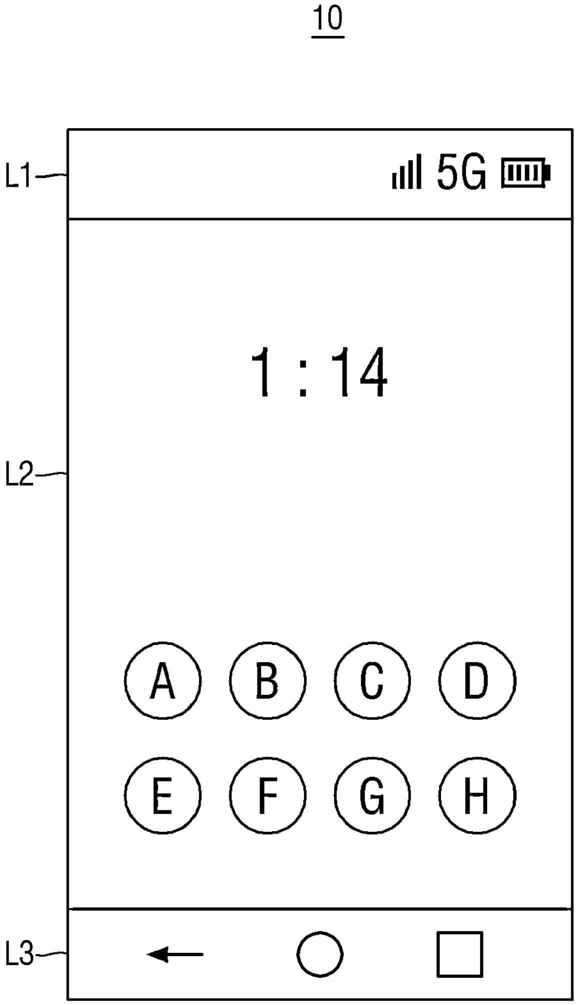
FIG. 2 is an exemplary diagram for explaining the operation of the display device according to some example embodiments.

FIG. 2 is an example diagram for explaining the operation of the display device according to some example embodiments.

Referring to FIG. 2, a display device 10 may output an image for each unit frame. For example, the image may include a plurality of layers L1 to L3.

Specifically, as shown in FIG. 2, a first layer L1 may include a status bar indicating a status of a smartphone, a second layer L2 may include a wall paper representing a background screen including the time of the smartphone and a plurality of applications, and a third layer L3 may include a navigator bar for performing the operation of the smartphone. Although FIG. 2 shows an image output from the screen of a smartphone, example embodiments are not limited thereto.

Figure 3:
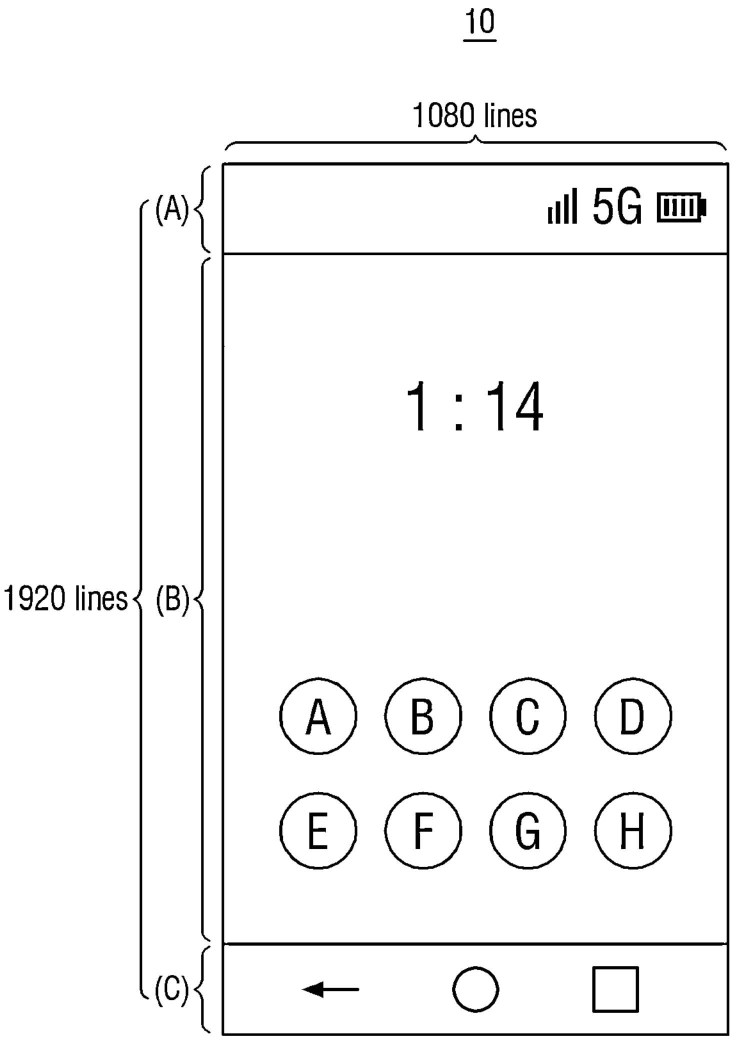
FIG. 3 is an exemplary diagram for explaining the operation of the display device according to some example embodiments.

FIG. 3 is an example diagram for explaining the operation of the display device according to some embodiments.

Referring to FIG. 3, the display device 10 may include 1920 pixel lines extending horizontally and 1080 pixel lines extending vertically. That is, the display device 10 may include 1920×1080 pixels, but example embodiments may include more or less pixels.

Referring to FIG. 2, the first layer L1 may include (A) pixel lines extending laterally, the second layer L2 may include (B) pixel lines extending laterally, and the third layer L3 may include (C) pixel lines extending laterally. That is, the sum of (A), (B), and (C) may have a value of 1920.

At this time, the first to third layers L1 to L3 may be output at different times from each other through the display panel of the display device 10 during unit frame.

For example, the display device 10 may operate at 60 Hz and output an image from top to bottom. At this time, the first layer L1 may be output for a time obtained by multiplying $\frac{1}{60}$ s by the value of the (A) lines/1920 lines during unit frame. The second layer L2 may be output for a time obtained by multiplying $\frac{1}{60}$ s by the value of the (B) lines/1920 lines after the first layer L1 is output. The third layer L3 may be output for a time obtained by multiplying $\frac{1}{60}$ s by the value of the (C) lines/1920 lines after the second layer L2 is output. That is, the first to third layers L1 to L3 may be output in a status in which they do not overlap in time.

The display controller according to some example embodiments, or the display device including the display controller may share the same hardware resources using a TDM (Time Division Multiplexing) type in processing a layer that is output through the display panel during unit frame as described above. Accordingly, since there may not be a need for additional hardware resources, the device area and power consumption can be reduced or minimized.

Figure 4:
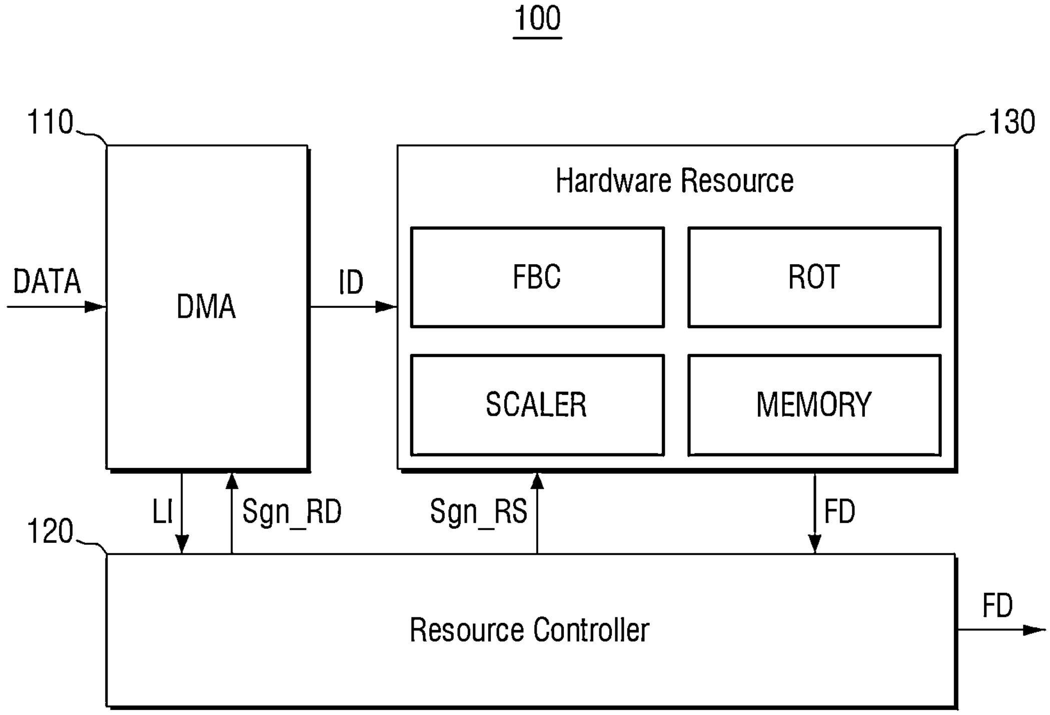
FIG. 4 is a block diagram for explaining a display controller included in the display device according to some example embodiments of FIG. 1.

FIG. 4 is a block diagram for explaining a display controller included in the display device according to some example embodiments of FIG. 1.

Referring to FIG. 4, the display controller 100 may include a data input DMA (Direct Memory Access) 110, a resource controller 120, and a hardware resource 130.

A data input DMA 110 may receive data (DATA) from the outside. For example, as described in FIG. 1, the data input DMA 110 may read and receive the data (DATA) from the memory 300. The data (DATA) received by the data input DMA 110 may be image data corresponding to the layer that is output through the display panel.

The data input DMA 110 may receive a ready signal Sgn_RD from the resource controller 120 and provide image data ID corresponding to the ready signal Sgn_RD to the hardware resource 130.

The resource controller 120 may receive layer information LI from the data input DMA 110. That is, the layer information LI may be included in the data (DATA) received from the outside by the data input DMA 110. However, example embodiments are not limited thereto, and the resource controller 120 may receive the layer information LI from other external configuration other than the data input DMA 110 or another configuration inside the display controller 100 which is not shown.

The resource controller 120 may control the data input DMA 110 on the basis of the received layer information LI. Specifically, the resource controller 120 may provide the ready signal Sgn_RD for each layer to the data input DMA 110 on the basis of the layer information LI, and may determine the order of the image data ID to be provided from the data input DMA 110 to the hardware resource 130 through the ready signal Sgn_RD.

The resource controller 120 may provide the resource signal Sgn_RS to the hardware resource 130 on the basis of the received layer information LI. Specifically, the resource controller 120 may select the resource required for the hardware resource 130 to process the image data ID received from the data input DMA 110 through the resource signal Sgn_RS.

However, although FIG. 4 shows that the resource controller 120 directly provides the resource signal Sgn_RS to the hardware resource 130 and selects the resource, example embodiments are not limited thereto. For example, the resource controller 120 may control the data input DMA 110 to select the resource, and may select the resources of the hardware resource 130 through other configurations included in the display controller 100.

The resource controller 120 may receive the frame data FD generated by completion of the processing of the image data from the hardware resource 130 and output it to the outside. For example, as shown in FIG. 1, the resource controller 120 may provide the received frame data FD to the display drive circuit 400.

The hardware resource 130 may receive image data ID from the data input DMA 110. The hardware resource 130 may include a plurality of resources for processing the received image data ID.

Specifically, the hardware resource 130 may include a frame buffer compressor (FBC) for compressing the image data, a scaler (SCALER) for adjusting the size of the image, a rotator (ROT) for processing the data when there is rotation of the image, and a memory (MEMORY) capable of storing processed image data. Although only the above four configurations are shown in FIG. 4, example embodiments are not limited thereto, and the hardware resource 130 may further include additional resources for image data processing, and may not include some of the aforementioned four configurations.

The hardware resource 130 may process the received image data ID using a plurality of resources as described above, and may generate the frame data FD accordingly. The hardware resource 130 may provide the generated frame data FD to the resource controller 120.

Figure 5:
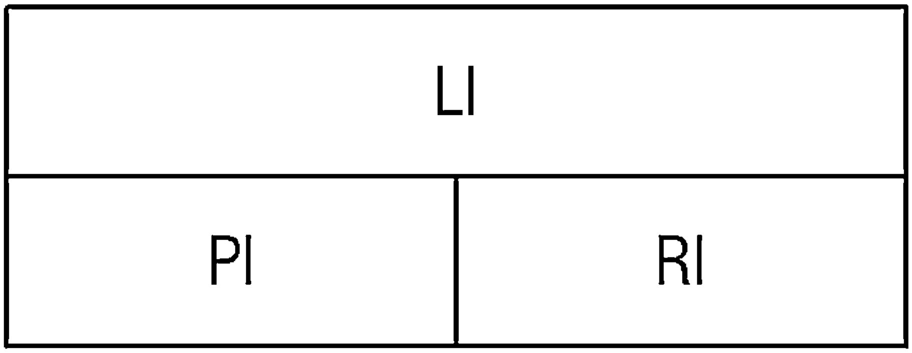
FIG. 5 is an exemplary diagram for explaining the layer information received by the display controller according to some example embodiments.

FIG. 5 is an example diagram for explaining the layer information received by the display controller according to some example embodiments.

Referring to FIG. 5, the layer information LI may include a layer position information PI and a resource information RI. Specifically, the layer information LI may include a layer position information PI and a resource information RI for each of the N layers that are output during unit frame.

The layer position information PI may include position information on the display panel of each layer that is output during unit frame. That is, the layer position information PI may include a position for each layer on the image. Specifically, the layer position information PI may include information about a start time point and an end time point at which each layer is output on the image during unit frame.

The resource information RI may include information about the resource that needs to be allocated to the hardware resource to output each layer. For example, the resource information RI may include information on which resource among the plurality of resources included in the hardware resource is used to process the image data corresponding to each layer.

However, example embodiments are not limited thereto, and the layer information LI may further include additional information for processing the image data in addition to the position information PI and the resource information RI.

Figure 6:
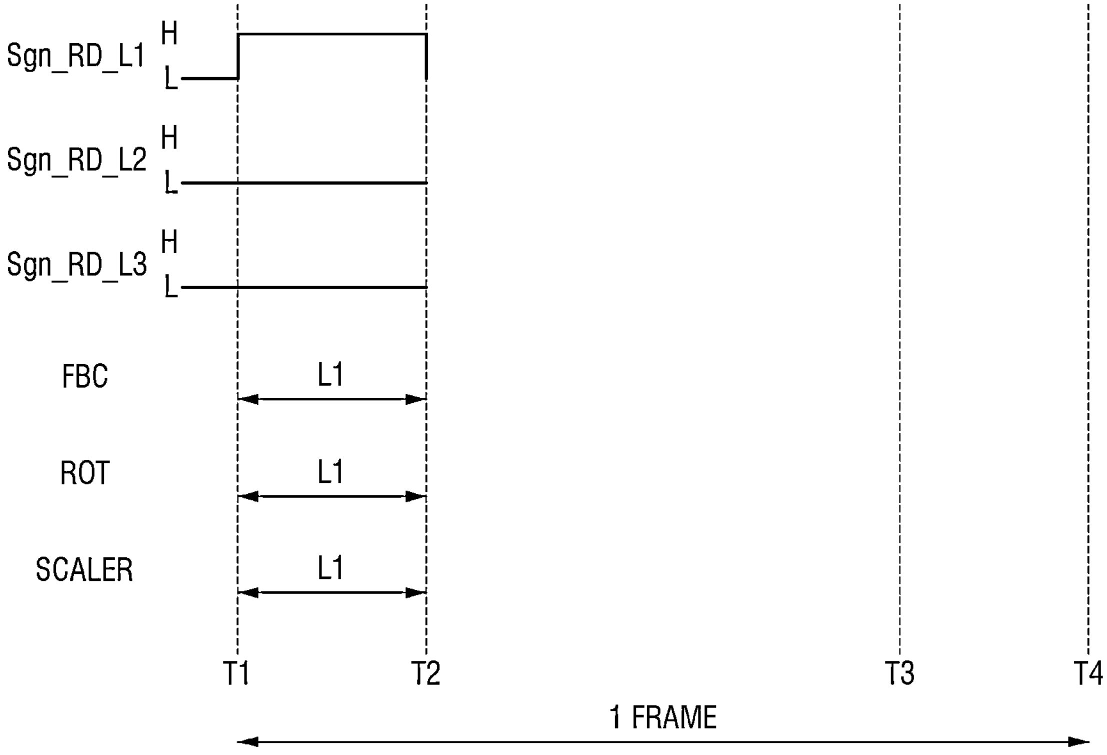
FIG. 6 is a timing diagram for explaining the operation of the display controller according to some example embodiments.
Figure 7:
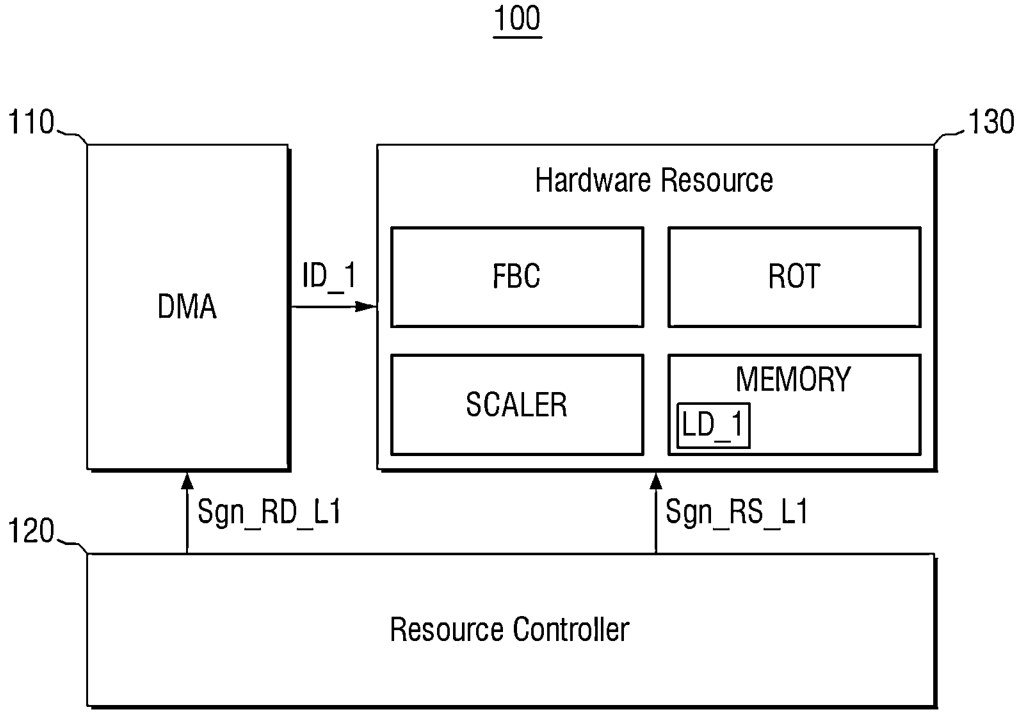
FIG. 7 is a block diagram for explaining the operation of the display controller according to some embodiments of FIG. 6.

FIG. 6 is a timing diagram for explaining the operation of the display controller according to some example embodiments, and FIG. 7 is a block diagram for explaining the operation of the display controller according to some example embodiments of FIG. 6.

First, as shown in FIG. 2, the layers that are output during unit frame may be the first to third layers L1 to L3, and each of the first to third layers L1 to L3 may not overlap each other in time.

Referring to FIGS. 6 and 7, because the first layer L1 is output first, the resource controller 120 may provide a first layer ready signal Sgn_RD_L1 to the data input DMA 110. The first layer ready signal Sgn_RD_L1 may transition from the first level L to the second level H higher than the first level at a first time point T1 when the processing of the first image data ID_1 is started. The first layer ready signal Sgn_RD_L1 may maintain the second level H from the first time point T1 to a second time point T2 at which the processing of the first image data ID_1 is completed.

The data input DMA 110 may provide the hardware resource 130 with a first image data ID_1 corresponding to the first layer in response to reception of the first layer ready signal Sgn_RD_L1.

On the other hand, in FIG. 4, the data (DATA) received from the outside by the data input DMA 110 may include first to third image data ID_1 to ID_3 corresponding to each of the first to third layers L1 to L3. The resource controller 120 may determine the processing order of the first to third image data ID_1 to ID_3, and the first to third image data ID_1 to ID_3 may be sequentially processed accordingly.

That is, the first image data ID_1 of the first layer L1 may be provided to the hardware resource 130 first. Although it is not shown in FIG. 7, the data input DMA 110 may include a buffer memory, and the buffer memory may store second and third image data ID_2 and ID_3 that have not yet been provided to the hardware resource 130.

The hardware resource 130 may receive the first image data ID_1 from the data input DMA 110, and process the first image data ID_1 by the use of the plurality of resources to generate the first layer data LD_1.

At this time, the resource for processing the first image data ID_1 in the hardware resource 130 may be selected by the first layer resource signal Sgn_RS_L1 received from the resource controller 120. That is, the resource controller 120 may select FBC, ROT, and SCALER among a plurality of resources for processing the first image data ID_1 on the basis of the first layer information, and the hardware resource 130 may process the first image data ID_1, using the FBC, ROT, and SCALER.

The hardware resource 130 may perform the data processing only on the first image data ID_1, using the resources selected from the first time point T1 to the second time point T2. The hardware resource 130 may process the first image data ID_1 to generate the first layer data LD_1 and temporarily store the first layer data LD_1 in the memory (MEMORY). At this time, although the memory (MEMORY) may be a SRAM, but example embodiments are not limited thereto.

Figure 8:
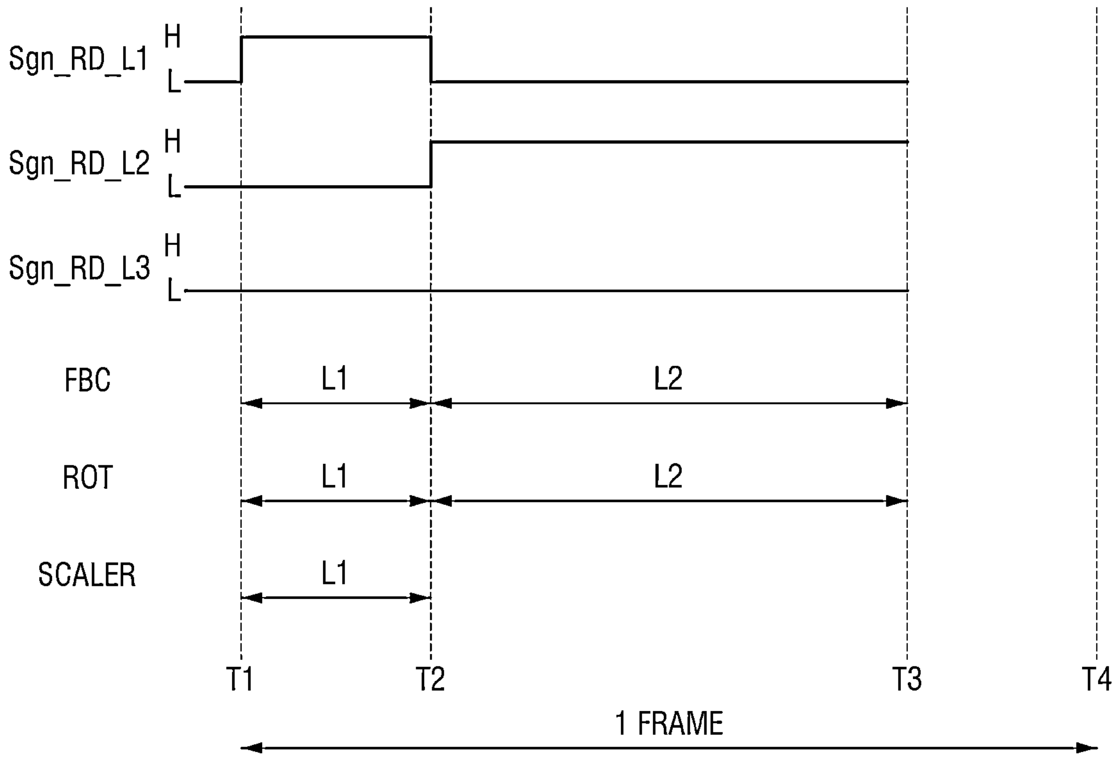
FIG. 8 is a timing diagram for explaining the operation of the display controller according to some example embodiments.
Figure 9:
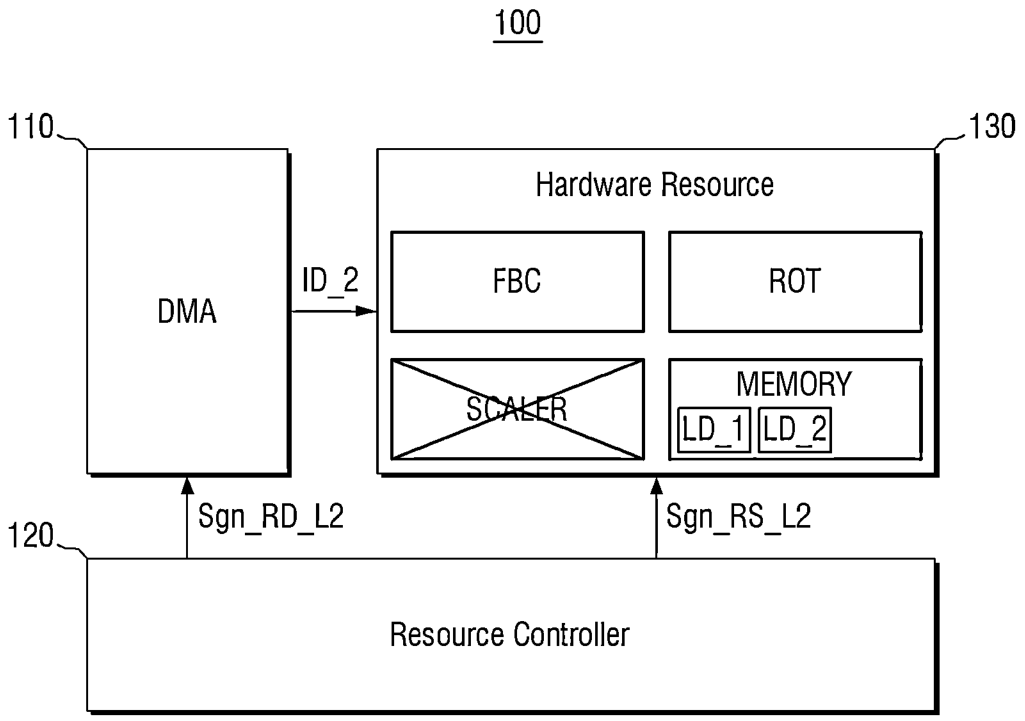
FIG. 9 is a block diagram for explaining the operation of the display controller according to some example embodiments of FIG. 8.

FIG. 8 is a timing diagram for explaining the operation of the display controller according to some example embodiments, and FIG. 9 is a block diagram for explaining the operation of the display controller according to some example embodiments of FIG. 8.

Referring to FIGS. 8 and 9, when the hardware resource 130 completes the processing of the first image data ID_1, the resource controller 120 then may provide a second layer ready signal Sgn_RD_L2 to the data input DMA 110. That is, at the second time point T2 when the processing of the first image data ID_1 is completed, the first layer ready signal Sgn_RD_L1 may transition from the second level H to the first level L, and the second layer ready signal Sgn_RD_L2 transitions from the first level L to the second level H at the second time point T2 and may maintain the second level H until a third time point T3 at which the processing of the second image data ID_2 is completed.

The data input DMA 110 may provide the hardware resource 130 with the second image data ID_2 corresponding to the second layer in response to reception of the second layer ready signal Sgn_RD_L2.

The hardware resource 130 may receive the second image data ID_2 from the data input DMA 110, and may process the second image data ID_2 by the use of a plurality of resources to process the second layer data LD_2.

At this time, the resource controller 120 may first release the resource selected to process the first image data ID_1 by the hardware resource 130. Specifically, the resource controller 120 releases the FBC, ROT, and SCALER selected to process the first image data ID_1 such that the hardware resource 130 may process the second image data ID_2.

The resource for processing the second image data ID_2 in the hardware resource 130 may be selected by a second layer resource signal Sgn_RS_L2 received from the resource controller 120. That is, the resource controller 120 may select FBC and ROT among a plurality of resources to process the second image data ID_2 on the basis of the second layer information, and the hardware resource 130 may process the second image data ID_2 using the FBC and ROT.

The hardware resource 130 may perform the data processing only on the second image data ID_2, using the resources selected from the second time point T2 to the third time point T3. The hardware resource 130 may process the second image data ID_2 to generate the second layer data LD_2, and may temporarily store the second image data ID_2 in the memory (MEMORY).

Figure 10:
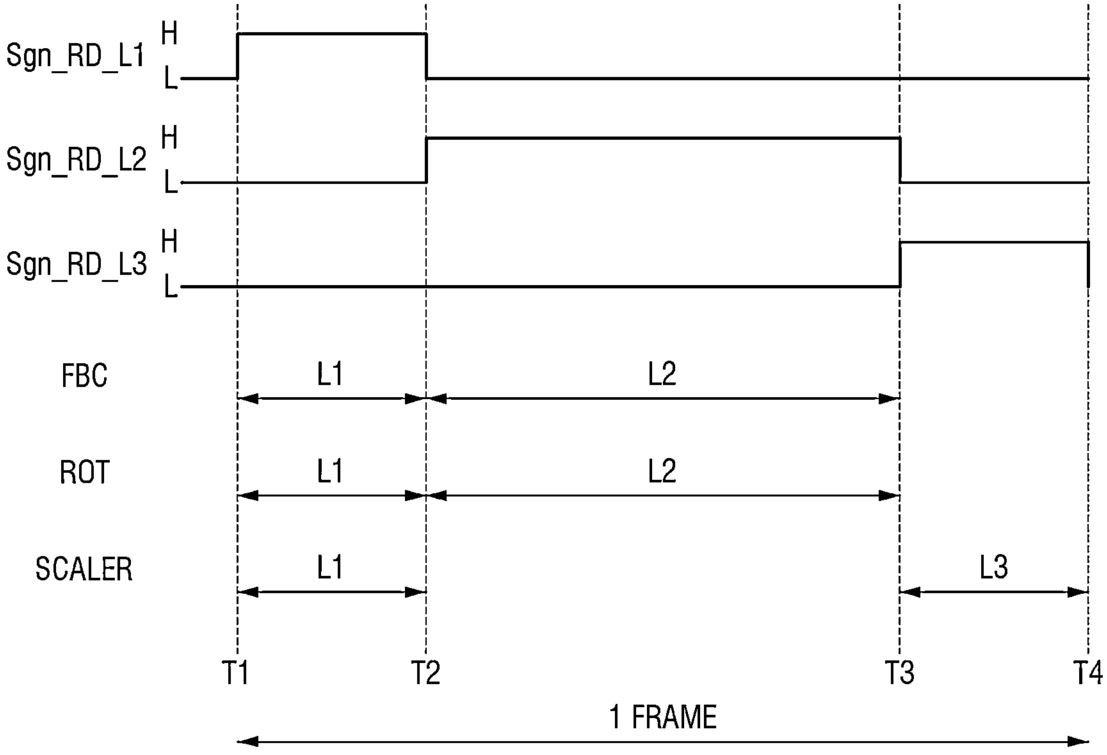
FIG. 10 is a timing diagram for explaining the operation of the display controller according to some example embodiments.
Figure 11:
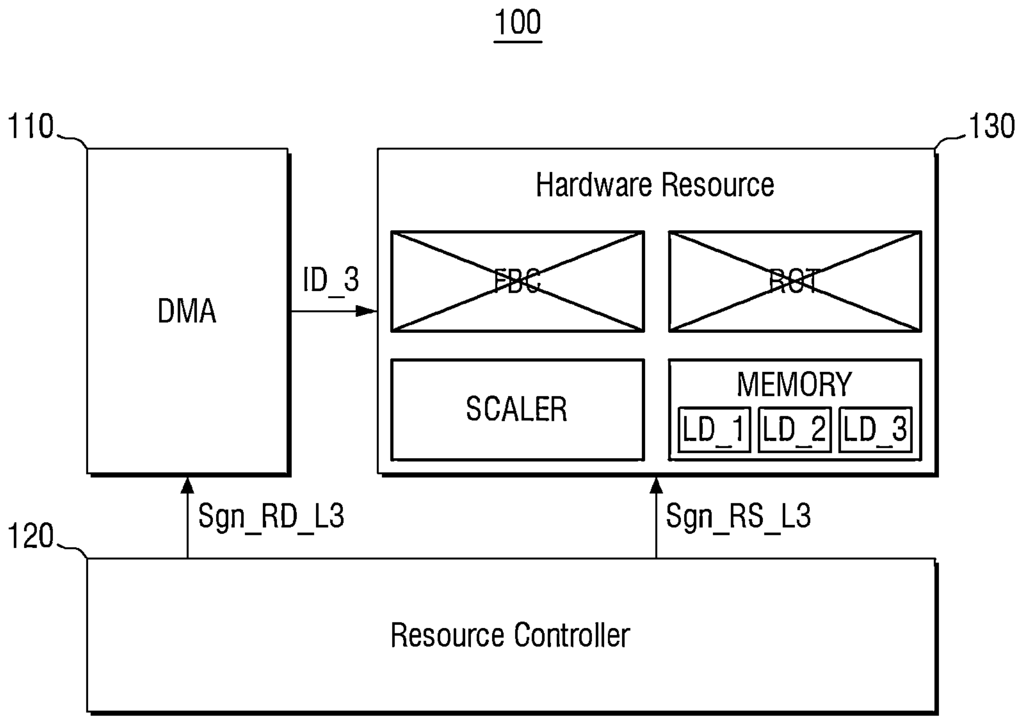
FIG. 11 is a block diagram for explaining the operation of the display controller according to some example embodiments of FIG. 10.

FIG. 10 is a timing diagram for explaining the operation of the display controller according to some example embodiments, and FIG. 11 is a block diagram for explaining the operation of the display controller according to some example embodiments of FIG. 10.

Referring to FIGS. 10 and 11, when the hardware resource 130 completes the processing of the second image data ID_2, the resource controller 120 may then provide a third layer ready signal Sgn_RD_L3 to the data input DMA 110. That is, at the third time point T3 when the processing of the second image data ID_2 is completed, the second layer ready signal Sgn_RD_L2 may transition from the second level H to the first level L, and the third layer ready signal Sgn_RD_L3 transitions from the first level L to the second level H at the third time point T3, and maintain the second level H until a fourth time point T4 at which the processing of the third image data ID_3 is completed.

The data input DMA 110 may provide the hardware resource 130 with the third image data ID_3 corresponding to the third layer in response to reception of the third layer ready signal Sgn_RD_L3.

The hardware resource 130 may receive the third image data ID_3 from the data input DMA 110, and may process the third image data ID_3 by the use of the plurality of resources to generate a third layer data LD_3.

At this time, the resource controller 120 may first release the resource selected to process the second image data ID_2 by the hardware resource 130. Specifically, the resource controller 120 releases the FBC and ROT selected to process the second image data ID_2 such that the hardware resource 130 may process the third image data ID_3.

The resource for processing the third image data ID_3 in the hardware resource 130 may be selected by a third layer resource signal Sgn_RS_L3 received from the resource controller 120. That is, the resource controller 120 may select the SCALER among a plurality of resources to process the third image data ID_3 on the basis of the third layer information, and the hardware resource 130 may process the third image data ID_3 using the SCALER.

The hardware resource 130 may perform the data processing only on the third image data ID_3 using the resources selected from the third time point T3 to the fourth time point T4. The hardware resource 130 may process the third image data ID_3 to generate the third layer data LD_3 and temporarily store the third layer data LD_3 in the memory (MEMORY).

When the image data processing is completed during unit frame from the first time point T1 to the fourth time point T4, the hardware resource 130 may merge the first to third layer data LD1 to LD3 stored in the memory (MEMORY), and provide them to the resource controller 120 as frame data FD, as shown in FIG. 4. After that, the resource controller 120 may provide the frame data FD to the display drive circuit, and the first to third layers may be output.

On the other hand, although FIGS. 6 to 11 show that the hardware resource 130 uses specific resources for each of the first to third image data ID_1 to ID_3 to process the first to third image data ID_1 to ID_3, this is merely for convenience of explanation, and example embodiments are not limited thereto. That is, the number of image data may vary depending on the number of layers to be output, and the resources for processing the image data may also vary according to various example embodiments.

Figure 12:
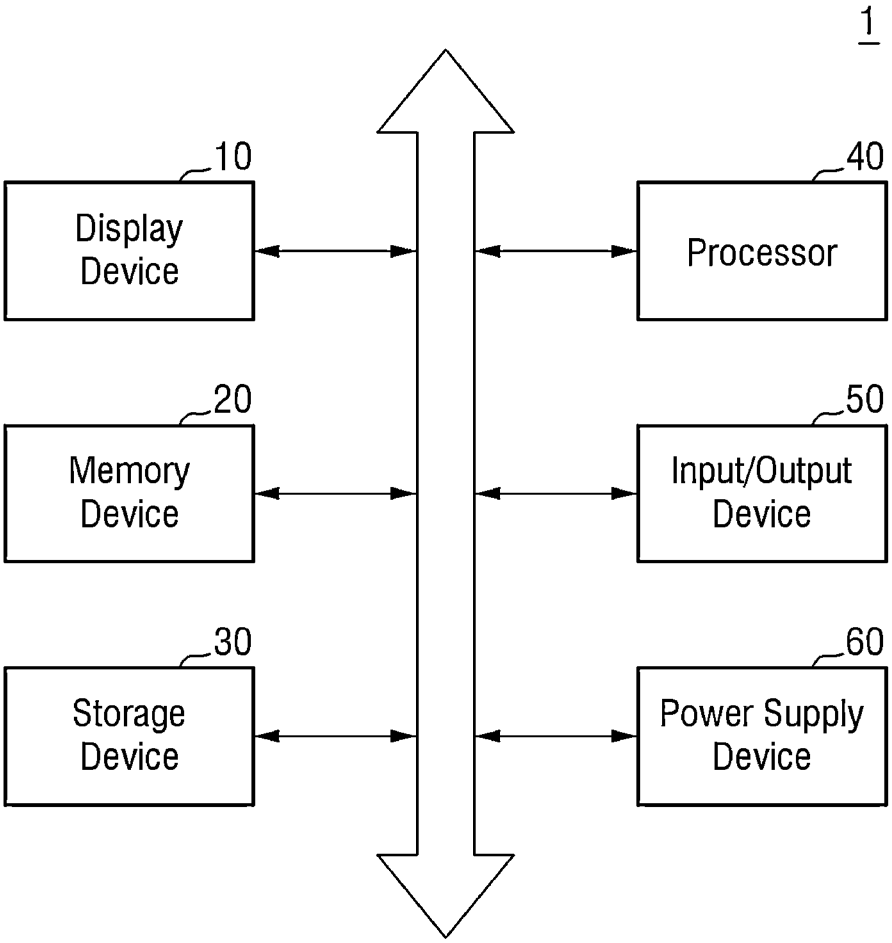
FIG. 12 is a block diagram showing an electronic device including a display device according to some example embodiments.
Figure 13:
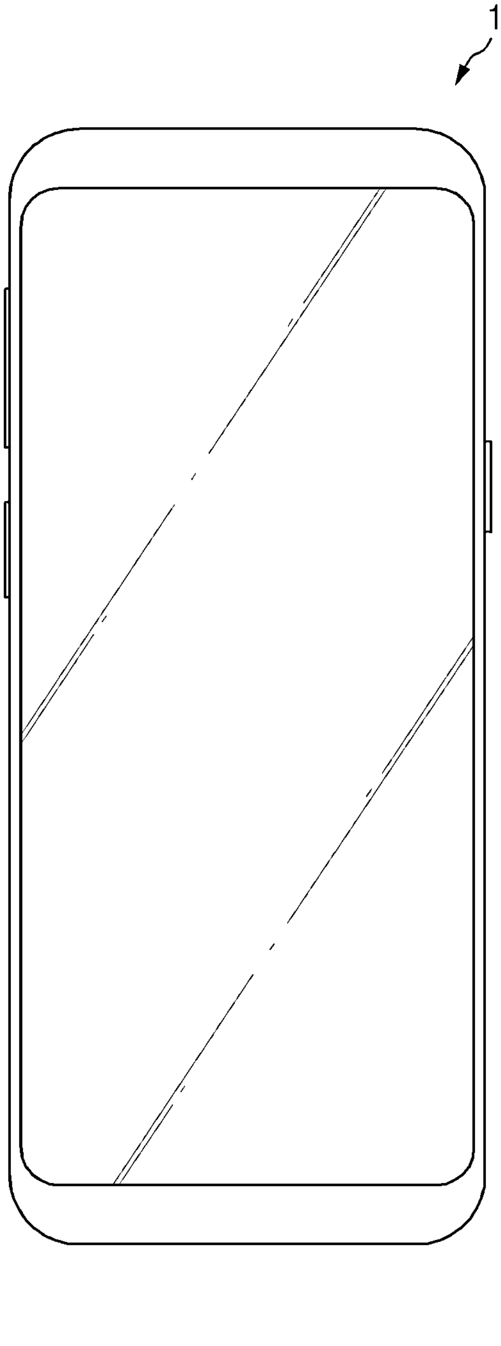
FIG. 13 is a diagram showing an electronic device on which the display device according to some example embodiments is mounted.

FIG. 12 is a block diagram showing an electronic device including a display device according to some example embodiments, and FIG. 13 is a diagram showing an electronic device on which the display device according to some example embodiments is mounted.

Referring to FIG. 12, an electronic device 1 may include a display device 10, a memory device 20, a storage device 30, a processor 40, an input/output device 50, and a power supply device 60. The electronic device 1 may further include a plurality of ports that may communicate with other systems.

As described above, the display device 10 may share hardware resources through time-sharing to reduce or minimize the area and minimize the power consumption.

The memory device 20 may store data necessary for the operation of the electronic device 1. For example, the memory device 20 may include non-volatile memory devices such as an EPROM (Erasable Programmable Read-Only Memory), an EEPROM (Electrically Erasable Programmable Read-Only Memory), a flash memory, a PRAM (Phase Change Random Access Memory), and an RRAM (Resistance Random Access Memory), and/or volatile memory devices such as a DRAM (dynamic random access memory) and a SRAM (static random access memory), but example embodiments are not limited thereto.

The storage device 30 may include a solid state drive (SSD), a hard disk drive (HDD), a CD-ROM, and the like.

The processor 40 may perform a particular calculation or task. The processor 40 may be a microprocessor, a central processing unit (CPU), or the like. The processor 40 may be connected to other components through a bus or the like.

The input/output device 50 may include input means such as a keyboard, a keypad, a touch pad, a touch screen, and a mouse, and/or output means such as a speaker and a printer, but example embodiments are not limited thereto.

The power supply device 60 may supply the electric power used for the operation of the electronic device 1.

The electronic device 1 may be, for example, a smartphone as shown in FIG. 13. Although FIG. 13 shows the smartphone as an example of the electronic device 1, the example embodiments are not limited thereto. Specifically, the electronic device 1 may be any electronic device 1 including a display device 10 such as a digital television, a 3D television, a personal computer (PC), a household electronic device, a laptop computer, a tablet computer, a mobile phone, a smart phone, a personal digital assistant (PDA), a portable multimedia player (PMP), a digital camera, a music player, a portable game console, navigation, etc.

Figure 14:
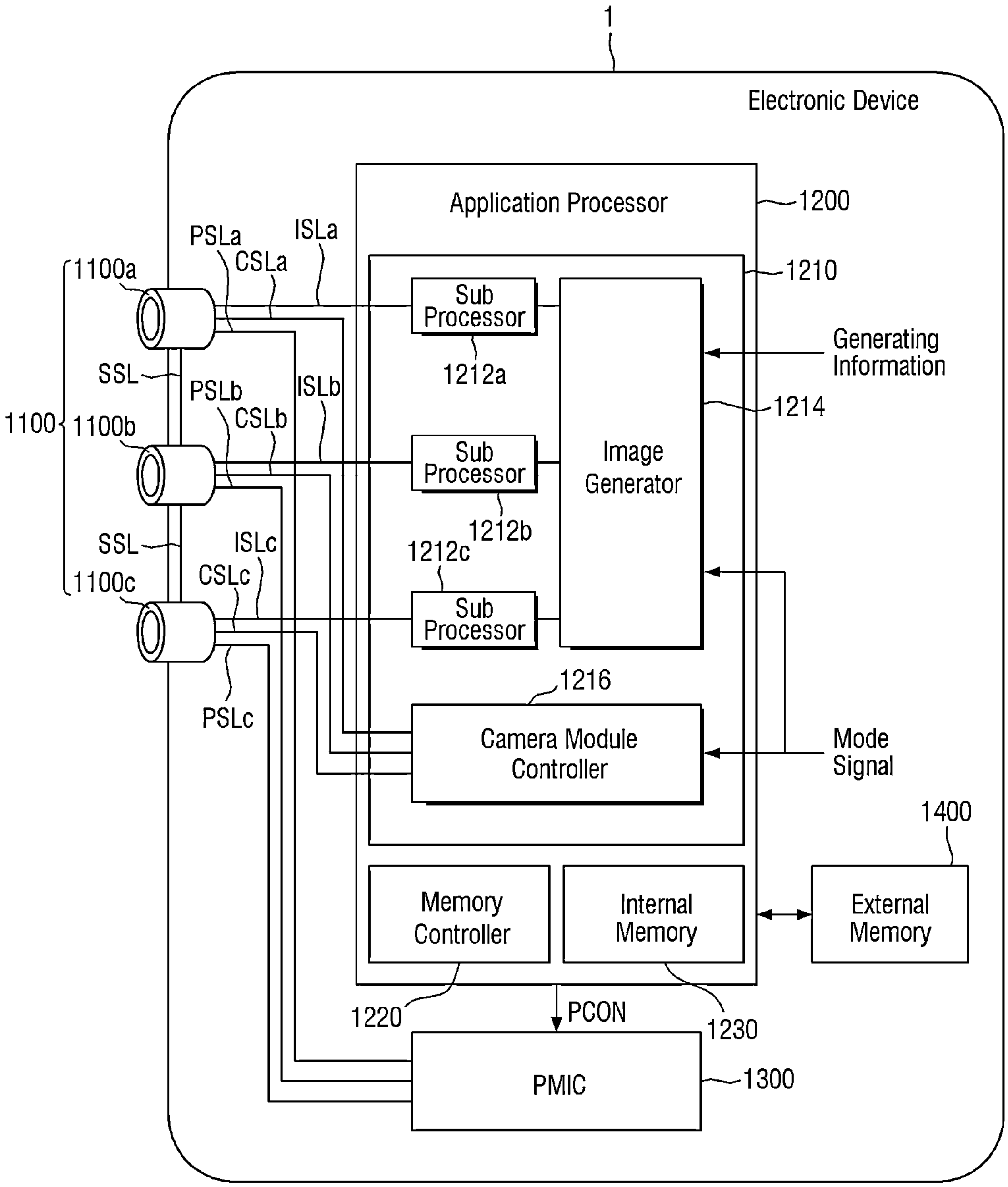
FIG. 14 is a block diagram of an example electronic device including a multi-camera module.
Figure 15:
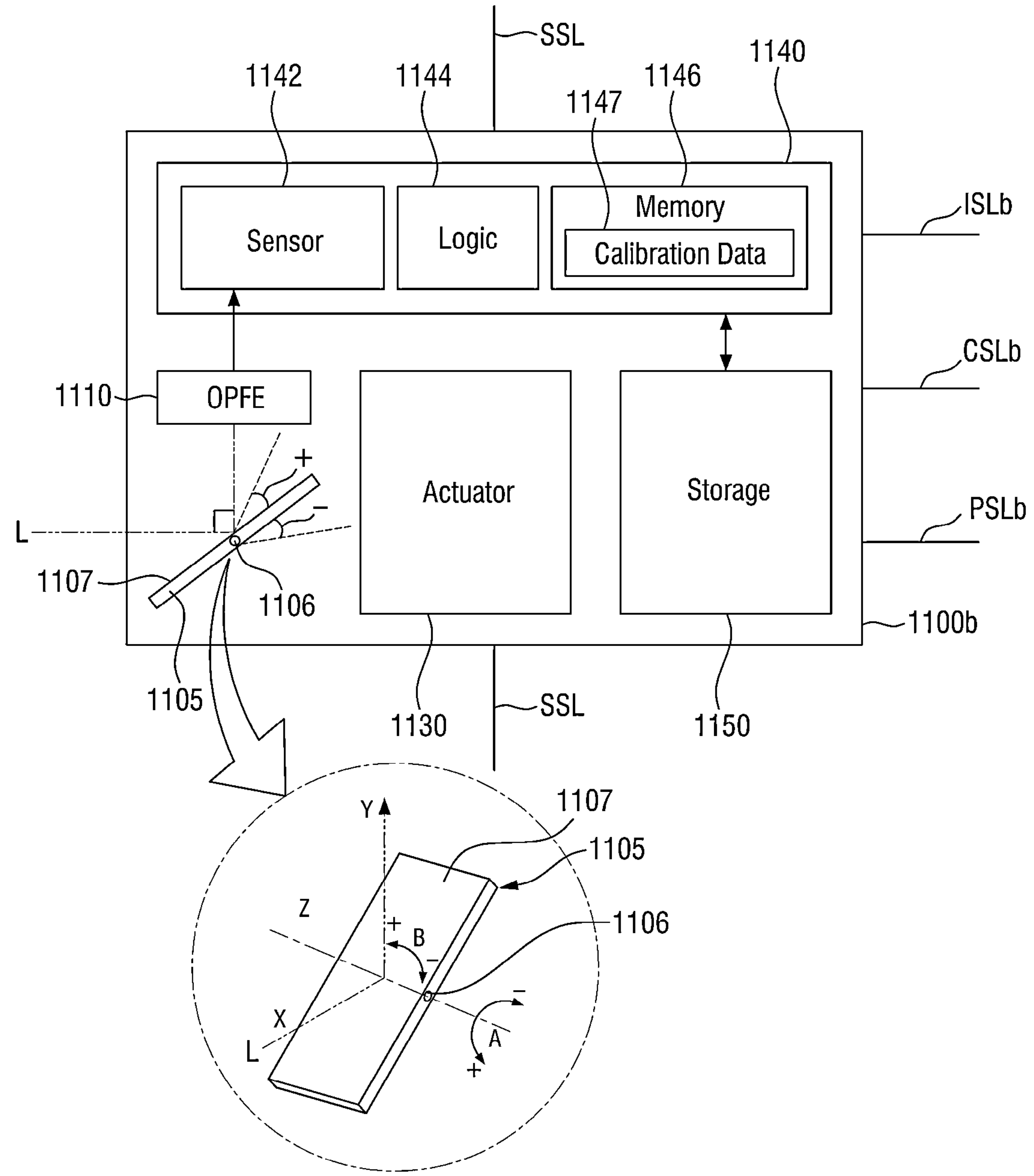
FIG. 15 is a detailed block diagram of the camera module of FIG. 14.

FIG. 14 is a block diagram of an example electronic device including a multi-camera module, and FIG. 15 is a detailed block diagram of the camera module of FIG. 14.

Referring to FIG. 14, the electronic device 1 may include a camera module group 1100, an application processor 1200, a PMIC 1300, and an external memory 1400.

The camera module group 1100 may include a plurality of camera modules **1100*a*, 1100*b*, and 1100*c*. Although FIG. 14 shows an example embodiment in which the three camera modules 1100*a*, 1100*b*, and 1100*c* are placed, example embodiments are not limited thereto. In some example embodiments, the camera module group 1100 may be modified and implemented to include only two camera modules. Also, in some example embodiments, the camera module group 1100** may be modified and implemented to include n (n is a natural number equal to or greater than 4) camera modules.

Hereinafter, although a detailed configuration of the camera module **1100*b* will be described in more detail referring to FIG. 15, the following description may also be equally applied to other camera modules 1100*a* and 1100*c*** according to various example embodiments.

Referring to FIG. 15, the camera module **1100*b* may include a prism 1105, an optical path folding element (hereinafter, "OPFE") 1110, an actuator 1130, an image sensing device 1140, and a storage unit 1150**.

The prism 1105 may include a reflecting surface 1107 of a light-reflecting material to change the path of light L that is incident from the outside.

In some example embodiments, the prism 1105 may change the path of light L incident in a first direction X to a second direction Y that is perpendicular or substantially perpendicular to the first direction X. Further, the prism 1105 may rotate the reflecting surface 1107 of the light-reflecting material in a direction A around a central axis 1106 or may rotate the central axis 1106 in a direction B to change the path of the light L incident in the first direction X into a vertical second direction Y. At this time, the OPFE 1110 may also move in a third direction Z that is perpendicular or substantially perpendicular to the first direction X and the second direction Y.

In some example embodiments, rotation angle (e.g., a maximum rotation angle) of the prism 1105 in the direction A may be equal to or less than 15 degrees in a positive (+) direction A, and may be greater than 15 degrees in a negative (−) direction A, but example embodiments are not limited thereto.

In some example embodiments, the prism 1105 may move about 20 degrees, or between 10 and 20 degrees, or between 15 and 20 degrees in the positive (+) or negative (−) direction B, but example embodiments are not limited thereto. Here, a moving angle may move at the same angle in the positive (+) or negative (−) direction B, or may move to almost the similar angle within the range of about 1 degree (or more or less degrees).

In some example embodiments, the prism 1105 may move the reflecting surface 1107 of the light-reflecting material in the third direction (e.g., the direction Z) parallel or substantially parallel to an extension direction of the central axis 1106.

The OPFE 1110 may include, for example, an optical lens including m (here, m is a natural number) groups. The m lenses may move in the second direction Y to change an optical zoom ratio of the camera module **1100*b*. For example, when a basic optical zoom ratio of the camera module 1100*b* is set as Z, if the m optical lenses included in the OPFE 1110 are moved, the optical zoom ratio of the camera module 1100*b*** may be changed to the optical zoom ratio of 3Z or 5Z or higher.

The actuator 1130 may move the OPFE 1110 or an optical lens (hereinafter, referred to as an optical lens) to a specific position. For example, the actuator 1130 may adjust the position of the optical lens so that an image sensor 1142 is located at a focal length of the optical lens for accurate sensing.

The image sensing device 1140 may include an image sensor 1142, control logic 1144 and a memory 1146. The image sensor 1142 may sense an image to be sensed, using light L provided through the optical lens. The control logic 1144 may control the overall operation of the camera module 1100*b*. For example, the control logic 1144 may control the operation of the camera module 1100*b* in accordance with the control signal provided through a control signal line CSLb.

The memory 1146 may store information used for the operation of the camera module 1100*b*, such as calibration data 1147. The calibration data 1147 may include information used by the camera module 1100*b* to generate image data, using the light L provided from the outside. The calibration data 1147 may include, for example, information on the degree of rotation, information on the focal length, information on the optical axis explained above, and the like. When the camera module 1100*b* is implemented in the form of a multi-state camera whose focal length changes depending on the position of the optical lens, the calibration data 1147 may include information about the focal length values for each position (or for each state) of the optical lens and auto focusing.

The storage unit 1150 may store the image data sensed through the image sensor 1142. The storage unit 1150 may be placed outside the image sensing device 1140, and may be implemented in the form of being stacked with sensor chips constituting the image sensing device 1140. In some example embodiments the storage unit 1150 may be implemented as an EEPROM (Electrically Erasable Programmable Read-Only Memory), but example embodiments are not limited thereto.

Referring to FIGS. 14 and 15 together, in some embodiments, each of the plurality of camera modules 1100*a*, 1100*b*, and 1100*c* may include an actuator 1130. Accordingly, each of the plurality of camera modules 1100*a*, 1100*b*, and 1100*c* may include calibration data 1147 that is the same as or different from each other according to the operation of the actuator 1130 included therein.

In some embodiments, one camera module (e.g., 1100*b*) among the plurality of camera modules 1100*a*, 1100*b*, and 1100*c* may be a folded lens type camera module including the prism 1105 and the OPFE 1110 described above, and the remaining camera modules (e.g., 1100*a* and 1100*c*) may be vertical camera modules which do not include the prism 1105 and the OPFE 1110. However, example embodiments are not limited thereto.

In some example embodiments, one camera module (e.g., 1100*c*) among the plurality of camera modules 1100*a*, 1100*b*, and 1100*c* may be a vertical depth camera which extracts depth information, for example, using an IR (Infrared Ray). In this case, the application processor 1200 may merge the image data provided from such a depth camera with the image data provided from another camera module (e.g., 1100*a* or 1100*b*) to generate a three-dimensional (3D) depth image.

In some example embodiments, at least two camera modules (e.g., 1100*a* and 1100*c*) among the plurality of camera modules 1100*a*, 1100*b*, and 1100*c* may have different fields of view from each other. In this case, for example, although the optical lenses of at least two camera modules (e.g., 1100*a* and 1100*c*) among the plurality of camera modules 1100*a*, 1100*b*, and 1100*c* may be different from each other, example embodiments are not limited thereto.

Also, in some example embodiments, viewing angles of each of the plurality of camera modules 1100*a*, 1100*b*, and 1100*c* may be different from each other. In this case, although the optical lenses included in each of the plurality of camera modules 1100*a*, 1100*b*, and 1100*c* may also be different from each other, example embodiments are not limited thereto.

In some example embodiments, each of the plurality of camera modules 1100*a*, 1100*b*, and 1100*c* may be placed to be physically separated from each other. That is, a sensing region of one image sensor 1142 may not be used separately by the plurality of camera modules 1100*a*, 1100*b*, and 1100*c*, but the independent image sensor 1142 may be placed inside each of the plurality of camera modules 1100*a*, 1100*b*, and 1100*c*.

Referring to FIG. 14 again, the application processor 1200 may include an image processing device 1210, a memory controller 1220, and an internal memory 1230. The application processor 1200 may be implemented separately from the plurality of camera modules 1100*a*, 1100*b*, and 1100*c*. For example, the application processor 1200 and the plurality of camera modules 1100*a*, 1100*b*, and 1100*c* may be implemented separately as separate semiconductor chips.

The image processing device 1210 may include a plurality of sub-image processors 1212*a*, 1212*b*, and 1212*c*, an image generator 1214, and a camera module controller 1216.

The image processing device 1210 may include a plurality of sub-image processors 1212*a*, 1212*b*, and 1212*c* corresponding to the number of the plurality of camera modules 1100*a*, 1100*b*, and 1100*c*.

Image data generated from each of the camera modules 1100*a*, 1100*b*, and 1100*c* may be provided to the corresponding sub-image processors 1212*a*, 1212*b*, and 1212*c* through image signal lines ISLa, ISLb, and ISLc separated from each other. For example, the image data generated from the camera module 1100*a* may be provided to the sub-image processor 1212*a* through an image signal line ISLa, the image data generated from the camera module 1100*b* may be provided to the sub-image processor 1212*b* through an image signal line ISLb, and the image data generated from the camera module 1100*c* may be provided to the sub-image processor 1212*c* through an image signal line ISLc. Although such an image data transmission may be performed using, for example, a camera serial interface (CSI) based on a mobile industry processor interface (MIPI), example embodiments are not limited thereto.

On the other hand, in some embodiments, a single sub-image processor may be placed to correspond to a plurality of camera modules. For example, the sub-image processor 1212*a* and the sub-image processor 1212*c* may not be implemented separately from each other as shown, but may be implemented by being integrated as a single sub-image processor. The image data provided from the camera module 1100*a* and the camera module 1100*c* may be selected through a selection element (e.g., a multiplexer) or the like, and then provided to an integrated sub-image processor.

The image data provided to the respective sub-image processors 1212*a*, 1212*b*, and 1212*c* may be provided to the image generator 1214. The image generator 1214 may generate the output image, using the image data provided from the respective sub-image processors 1212*a*, 1212*b*, and 1212*c* according to the image generating information or the mode signal.

Specifically, the image generator 1214 may merge at least some of the image data generated from the camera modules 1100*a*, 1100*b*, and 1100*c* having different viewing angles to generate the output image, in accordance with the image generating information or the mode signal. Further, the image generator 1214 may select any one of the image data generated from the camera modules 1100*a*, 1100*b*, and

1100*c* having different viewing angles to generate the output image, in accordance with the image generating information or the mode signal.

In some example embodiments, the image generating information may include a zoom signal (or a zoom factor). Also, in some example embodiments, the mode signal may be, for example, a signal based on the mode selected from a user.

When the image generating information is a zoom signal (a zoom factor) and each of the camera modules 1100*a*, 1100*b*, and 1100*c* has fields of view (viewing angles) different from each other, the image generator 1214 may perform different operations depending on the type of zoom signals. For example, when the zoom signal is a first signal, the image data output from the camera module 1100*a* and the image data output from the camera module 1100*c* may be merged, and then, an output image may be generated, using the merged image signal and the image data output from the camera module 1100*b* which is not used for merging. If the zoom signal is a second signal that is different from the first signal, the image generator 1214 may not merge the image data, and may select any one of the image data output from each of the camera modules 1100*a*, 1100*b*, and 1100*c* to generate the output image. However, example embodiments are not limited thereto, and a method of processing the image data may be modified as much as desired.

In some example embodiments, the image generator 1214 may receive a plurality of image data with different exposure times from at least one of the plurality of sub-image processors 1212*a*, 1212*b* and 1212*c*, and perform high dynamic range (HDR) processing on the plurality of image data to generate merged image data with an increased dynamic range.

The camera module controller 1216 may provide the control signal to each of the camera modules 1100*a*, 1100*b*, and 1100*c*. The control signals generated from the camera module controller 1216 may be provided to the corresponding camera modules 1100*a*, 1100*b*, and 1100*c* through the control signal lines CSLa, CSLb and CSLc separated from each other.

One of the plurality of camera modules 1100*a*, 1100*b*, and 1100*c* may be designated as a master camera (e.g., 1100*b*) depending on the image generating information including the zoom signal or the mode signal, and the remaining camera modules (e.g., 1100*a* and 1100*c*) may be designated as slave cameras. This information may be included in the control signal, and may be provided to the corresponding camera modules 1100*a*, 1100*b*, and 1100*c* through the control signal lines CSLa, CSLb and CSLc separated from each other.

The camera modules that operate as master and slave may be changed depending on the zoom factor or the operating mode signal. For example, if the viewing angle of the camera module 1100*a* is wider than that of the camera module 1100*b* and the zoom factor exhibits a low zoom ratio, the camera module 1100*b* may operate as the master, and the camera module 1100*a* may operate as the slave. In contrast, when the zoom factor exhibits a high zoom ratio, the camera module 1100*a* may operate as the master and the camera module 1100*b* may operate as the slave.

In some example embodiments, the control signals provided from the camera module controller 1216 to the respective camera modules 1100*a*, 1100*b*, and 1100*c* may include a sync enable signal. For example, if the camera module 1100*b* is the master camera and the camera modules 1100*a* and 1100*c* are the slave cameras, the camera module controller 1216 may transmit the sync enable signal to the camera module 1100*b*. The camera module 1100*b*, which receives the sync enable signal, generates a sync signal on the basis of the received sync enable signal, and may provide the generated sync signal to the camera modules 1100*a* and 1100*c* through the sync signal line SSL. The camera module 1100*b* and the camera modules 1100*a* and 1100*c* may transmit the image data to the application processor 1200 in synchronization with such a sync signal.

In some example embodiments, the control signals provided from the camera module controller 1216 to the plurality of camera modules 1100*a*, 1100*b*, and 1100*c* may include mode information according to the mode signal. On the basis of the mode information, the plurality of camera modules 1100*a*, 1100*b*, and 1100*c* may operate in a first operating mode and a second operating mode in connection with the sensing speed.

The plurality of camera modules 1100*a*, 1100*b*, and 1100*c* may generate an image signal at a first speed in the first operating mode (for example, generate an image signal of a first frame rate), encode the image signal at a second speed higher than the first speed (for example, encode an image signal of a second frame rate higher than the first frame rate), and transmit the encoded image signal to the application processor 1200. At this time, the second speed may be 30 times or less of the first speed.

The application processor 1200 may store the received image signal, for example, the encoded image signal, in the memory 1230 provided inside or an external storage 1400 of the application processor 1200, and then read and decode the encoded image signal from the memory 1230 or the storage 1400, and display image data generated on the basis of the decoded image signal. For example, the corresponding sub-processors among the plurality of sub-processors 1212*a*, 1212*b*, and 1212*c* of the image processing device 1210 may perform decoding, and may also perform the image processing on the decoded image signal.

A plurality of camera modules 1100*a*, 1100*b*, and 1100*c* may generate image signals at a third speed lower than the first speed in the second operating mode (for example, generate an image signal of a third frame rate lower than the first frame rate), and transmit the image signal to the application processor 1200. The image signal provided to the application processor 1200 may be a non-encoded signal. The application processor 1200 may perform the image processing on the received image signal or store the image signal in the memory 1230 or the storage 1400.

The PMIC 1300 may supply a power, e.g., a power supply voltage, to each of the plurality of camera modules 1100*a*, 1100*b*, and 1100*c*. For example, the PMIC 1300 may supply a first power to the camera module 1100*a* through a power signal line PSLa, supply a second power to the camera module 1100*b* through a power signal line PSLb, and supply a third power to the camera module 1100*c* through a power signal line PSLc, under the control of the application processor 1200.

The PMIC 1300 may generate power corresponding to each of the plurality of camera modules 1100*a*, 1100*b*, and 1100*c* and adjust the level of power, in response to a power control signal PCON from the application processor 1200. The power control signal PCON may include power adjustment signals for each operating mode of the plurality of camera modules 1100*a*, 1100*b*, and 1100*c*. For example, the operating mode may include a low power mode, and at this time, the power control signal PCON may include information about the camera module that operates in the low power mode and the power level to be set. The levels of powers provided to each of the plurality of camera modules 1100*a*, 1100*b*, and 1100*c* may be the same as or different from each other. Also, the levels of power may be changed dynamically.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

Although various example embodiments have been described with reference to the accompanying drawings, example embodiments may be manufactured in various forms without being limited to the above-described example embodiments and can be embodied in other specific forms without departing from the scope of the inventive concepts. Thus, the above example embodiments are to be considered in all respects as illustrative and not restrictive.

What is claimed is:

1. A display controller comprising:

a resource controller configured to receive layer information about each of a first layer and a second layer before output of the first and second layers, the first and second layers output at different times through a display panel during a unit frame;

a data input direct memory access (DMA) configured to receive first image data and second image data from outside the display controller, the first image data corresponding to the first layer and the second image data corresponding to the second layer; and a hardware resource configured to receive the first and second image data from the data input DMA, the hardware resource including a plurality of resources configured to process the received first and second image data according to the layer information, and generate first layer data of the first layer and second layer data of the second layer, wherein the resource controller is configured to control the data input DMA according to the layer information to determine an order in which the first image data and the second image data are provided to the hardware resource, and the resource controller is configured to select a portion of the plurality of resources for the hardware resource to process the first image data according to the layer information.

2. The display controller of claim 1, wherein the resource controller is configured to provide a first ready signal to the data input DMA, and the data input DMA is configured to provide the first image data to the hardware resource in response to the first ready signal.

3. The display controller of claim 2, wherein when the hardware resource is configured to process the first image data, the resource controller is configured to then provide a second ready signal to the data input DMA, and the data input DMA is configured to provide the second image data to the hardware resource in response to the second ready signal.

4. The display controller of claim 1, wherein when the hardware resource processes the first image data, the resource controller is configured to release a part of the plurality of resources selected for processing the first image data, and the resource controller is configured to select a portion of the plurality of resources to process the second image data according to the layer information.

5. The display controller of claim 1, wherein the hardware resource includes at least one of a frame buffer compressor (FBC), a scaler, a rotator, and a static random access memory (SRAM).

6. The display controller of claim 5, wherein the hardware resource is configured to process the first image data using the frame buffer compressor and the rotator, and process the second image data using the scaler.

7. The display controller of claim 4, wherein the hardware resources include the SRAM, and when generation of the first and second layer data is completed, the SRAM is configured to merge the first and second layer data and provide the first and second layer data to the resource controller as frame data.

8. The display controller of claim 1, wherein the layer information includes at least one of position information about a position of each layer that is output during the unit frame, and resource information about a resource to be allocated to the hardware resource to output each layer.

9. The display controller of claim 1, wherein the data input DMA includes a buffer memory, and the buffer memory is configured to store remaining image data other than image data provided to the hardware resource.

10. A display device comprising:

a processor configured to generate first image data and second image data;

a memory configured to store the first and second image data; and a display controller configured to read and process the first and second image data from the memory, wherein the display controller is configured to receive layer information about a first layer corresponding to the first image data and a second layer corresponding to the second image data, before the first and second image data are processed and output through a display panel, the display controller is configured to generate first layer data corresponding to the first layer and second layer data corresponding to the second layer at different times within a unit frame, according to the layer information, the layer information includes at least one of position information about a position of each layer output during the unit frame, and resource information indicating which of a plurality of resources is allocated to output each layer, the plurality of resources is included in the display controller, the plurality of resources is configured to process the first and second image data, and the display controller is configured to select a portion of the plurality of resources for processing the first and second image data according to the layer information.

11. The display device of claim 10, wherein the display controller is configured to determine an order of processing the first image data and the second image data according to the layer information.

12. The display device of claim 10, wherein the plurality of resources includes at least one of a frame buffer compressor (FBC), a scaler, a rotator, and a static random access memory (SRAM).

13. The display device of claim 12, wherein the display controller is configured to process the first image data using the frame buffer compressor and the rotator, and processes the second image data using the scaler.

14. The display device of claim 12, wherein when generation of the first and second layer data is completed, the SRAM is configured to merge the first and second layer data and output the first and second layer data as frame data.

15. A display device comprising:

a display controller configured to process first image data and second image data input to the display controller, and generate frame data including first layer data corresponding to the first image data and second layer data corresponding to the second image data;

a display drive circuit configured to receive the frame data from the display controller and drive a display panel according to the frame data; and the display panel configured to output an image according to the frame data, wherein the image includes first and second layers which are output at different times from each other during a unit frame, before the first and second layers are output through the display panel, the display controller is configured to receive layer information about each of the first and second layers, and process the first image data and the second image data, the layer information includes at least one of position information about a position of each layer that is output during the unit frame, and resource information indicating which of a plurality of resources is allocated to output each layer, the plurality of resources is included in the display controller, the plurality of resources is configured to process the first and second image data, and the display controller is configured to select a portion of the plurality of resources required for processing the first and second image data according to the layer information.

16. The display device of claim 15, wherein the display controller is configured to determine an order of processing the first image data and the second image data according to the layer information.

17. The display device of claim 15, wherein the plurality of resources includes at least one of a frame buffer compressor (FBC), a scaler, a rotator, and a static random access memory (SRAM).

* * * * *